(12) United States Patent
Yang

(10) Patent No.: US 7,577,221 B2
(45) Date of Patent: Aug. 18, 2009

(54) RECEIVER SCHEME FOR SYNCHRONOUS DIGITAL TRANSMISSION

(75) Inventor: Weiguo Yang, East Windsor, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 596 days.

(21) Appl. No.: 11/365,254

(22) Filed: Mar. 1, 2006

(65) Prior Publication Data

US 2007/0206608 A1 Sep. 6, 2007

(51) Int. Cl.
*H04L 7/00* (2006.01)
(52) U.S. Cl. ................ 375/355; 375/371; 370/503; 370/516
(58) Field of Classification Search ........... 375/340, 375/354, 355, 360, 371; 370/503, 516; 327/154, 327/160, 162
See application file for complete search history.

(56) References Cited

U.S. PATENT DOCUMENTS 5,121,413 A 6/1992 Voegtly et al.
5,689,507 A * 11/1997 Bloks et al. .......... 370/389
6,671,343 B1 * 12/2003 Ito ........................ 375/376
2004/0264612 A1 12/2004 Allen
2007/0025484 A1 * 2/2007 Laine et al.

FOREIGN PATENT DOCUMENTS

EP 0 452 023 A2 10/1991
JP 04 260248 A 9/1992

OTHER PUBLICATIONS

International Search Report and Written Opinion in corresponding PCT/US2007/004855, Jul. 9, 2007, Lucent Technologies Inc.

* cited by examiner

*Primary Examiner*—Dac V Ha

(57) ABSTRACT

A method, apparatus and system for improving the tolerance for timing jitter noise by eliminating the need to recover clock information from the input signal. There is no need to communicate clock synchronization information between transmit and receive gateways. In addition, the new receiving scheme can work in burst mode in its true sense, i.e., recovering data bits from the first incoming bit after an arbitrary period of time without transmitting.

19 Claims, 4 Drawing Sheets

RECEIVER SCHEME FOR SYNCHRONOUS DIGITAL TRANSMISSION

FIELD OF THE INVENTION

The invention is related to the field of digital transmission, and in particular, to a receiver scheme for synchronous optical network.

BACKGROUND OF THE INVENTION

Current digital receivers typically include a clock recovery circuit, a sample/hold circuit, and a comparator. An input signal having a pulse train is received and processed by the digital receiver to extract therefrom a data stream. Briefly, the clock recovery circuit recovers a clock from the input signal. The sample/hold circuit uses the recovered clock to sample the input pulse train and produce a steady signal level for processing by the comparator. The comparator compares the analog value of the sampled signal to a threshold value to determine the sample value, which may be further processed by demodulators and the like. This process is repeated for each clock cycle.

Operation of current digital receivers may be degraded in the presence of an input signal experiencing timing jitter. This is because the timing jitter causes the clock recovery circuit to select clock events that may be inaccurate, which in turn causes the data slicing level used by the comparator to be inaccurate, resulting in a bit errors that may or may not be correctable. Moreover, several bit periods are usually necessary for a recovered clock to be stable. Thus, due to clock recovery errors and/or the time necessary to establish a stable clock, the recovery of a burst mode digital transmission signal is difficult.

SUMMARY

The present invention improves upon the prior art by providing a digital receiver that is well adapted to both burst mode and continuous mode digital signal reception. Specifically, a digital receiver according to the present invention provides a sequence of time stamps which are associated by a sample and hold circuit with a sequence of pulses within an input pulse train. The input pulse train includes a sequence of pulses that represents the information being transmitted. The sample and hold circuit contains a time stamp provided by a counter. Each pulse triggers the sample and hold circuit to release the time stamp to a buffer. Thus, the buffer includes a series of time stamps associated with the series of pulses of the input pulse train. The input pulse train can be recreated using the time stamp information. The transmitted values of the input pulse train are then determined by a processor using the time stamps associated with input pulse train. In this manner, errors normally associated with an improper data slice level of a comparator are avoided.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

The invention will be primarily described within the context of a synchronous digital receiver; however, those skilled in the art and informed by the teachings herein will realize that the invention is also applicable to any apparatus and method that involves synchronizing received signals.

Figure 1:
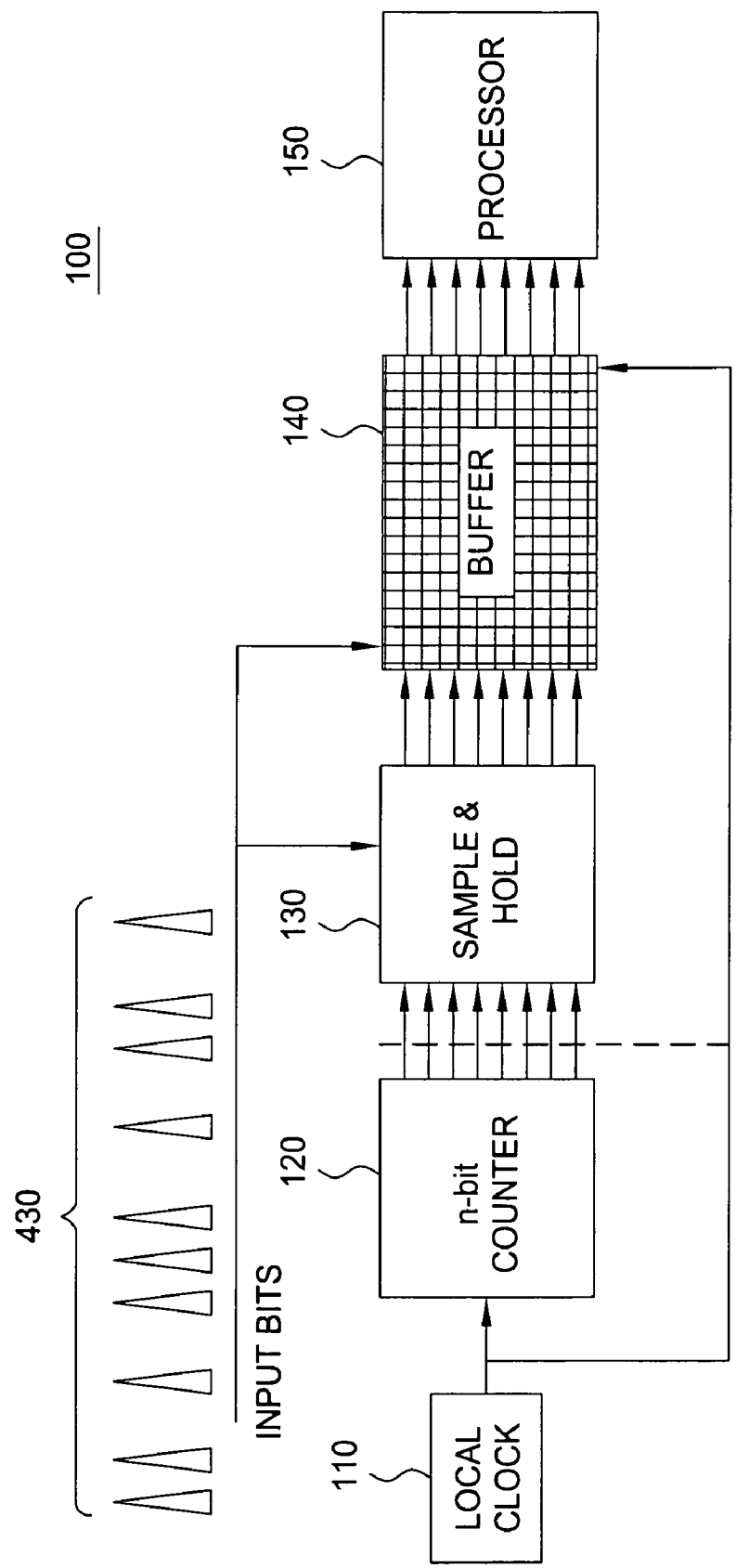
FIG. 1 depicts a block diagram of a receiver according to an embodiment of the present invention.

FIG. 1 depicts a block diagram of a receiver according to one embodiment of the present invention. The incoming signal is an input pulse train, which includes either optical or electrical input signals. The receiver 100 is a synchronous digital receiver that is designed for either optical or electrical input signals. In one embodiment, the receiver receives an optical input signal. The gates of the receiver are optical gates. In another embodiment, the input signal is electrical signal, or the input signal is first converted to an electrical signal. The receiver in this embodiment includes electronic gates.

The receiver 100 of FIG. 1 receives the input pulse train and includes a local clock 110, an n-bit counter 120, a sample/hold circuit (S&H) 130, a buffer 140 and a processor 150.

The local clock 110 provides fixed clocking signals at regular intervals (clock cycles) to digitize the time of the arrival of input pulses. The local clock is communicated to the n-bit counter 120 and the output of the buffer 150. In one embodiment, the clock 110 is a local oscillator.

The n-bit counter 120 receives the local clock 110 and produces an n-bit value, which is incremented at every clock cycle. The counter 120 functions as a timer. The counter 120 recalls the time of the pulses of the pulse train by incrementing an n-bit value for every incoming clock pulse from the local clock 110. The counter 120 then communicates the n-bit value to the S&H 130 as the time stamp of pulse of the pulse train.

The S&H 130 is triggered by incoming pulses from the input pulse train to hold the current count from the counter 120 as the time stamp. Each input pulse that is received by the S&H 130 enables the S&H such that it holds the time stamp for transmission to buffer 140. In one embodiment, the S&H holds the time stamp from the counter 120, which is transmitted by the counter output to the buffer 140. The time stamp represents the arrival time of the input pulses of the pulse train at the next clock cycle.

The buffer 140 stores the time stamp values from the S&H 130. In one embodiment, the buffer 140 is a first-in-first-out (FIFO) buffer having a plurality of shift registers. Other buffers, queues, and memory devices may be used in conjunction with the respective buffers, queues or memory controllers to perform the equivalent FIFO function. The contents in the buffer 140 are released to the processor 150 at a fixed rate determined by the local clock 110. In one embodiment, shift registers of the FIFO buffer 140 are triggered by input pulses from the local clock. At each cycle of the local clock, the FIFO buffer 140 transmits a time stamp value from the S&H 130 to the FIFO buffer 140 if there is a value stored in the S&H 130. The time stamp value is stored in a first shift register of the FIFO buffer. If there is no pulse at the input pulse train, then the S&H 130 will not have a time stamp value for that clock cycle because no pulse triggers the S&H 130 to store the time stamp. At a future clock cycle when the next pulse of the pulse train is received, the S&H stores the time stamp corresponding to that pulse. At the following clock cycle, the S&H sends the time stamp value of that pulse to the FIFO buffer. In the FIFO buffer, the value in the first shift register passes to the second shift register, and the new value from the S&H is stored in the first shift register. The local clock triggers the passing of time stamp values in the shift register. At the output of the buffer 140 or the last shift register, the time stamp value that is stored is transmitted from the buffer 140 to the processor 150. Thus, the time stamp value is communicated to the processor 150. In another embodiment, the local clock maybe a global clock or a timer.

The processor 150 processes the time stamp value using an algorithm to recover the incoming digital bits of the input signal described below in FIG. 3. By obtaining all the time stamp values, the processor realizes all the time slots containing the "1" bit. After appending the "0" bits to the remaining time slots, the original information are recovered.

In another embodiment, the receiver takes a random incoming bit sequence ($b_n$; $n \geq 0$), with $b_0=1$ and the arriving time relative to the first bit is ($T_n$) with $T_n < T_{n+1}$. Consider the time interval ($\Delta T_n = T_n - T_{n-1} > 0$, $n>0$), one has $\overline{\Delta T_n} = T$, where $1/T$ is the digital transmission rate. Assuming ($t_k$) is the subset of ($T_n$) so that ($b_k$) is all 1s in the sequence. Then, the closest integers to ($t_k/T$) can be considered as time slots where "1" is being transmitted. If there are empty time slots in between neighboring 1s, then the symbol transmitted at those time slots are zeros. For example, assume the input bit sequence is (10010111) with nominal data rate of 1 in arbitrary unit. There are total of five ones in this eight bit sequence. The arriving times for these ones are for example 0.0016, 3.0994, 5.2204, 6.1892, and 6.881. The closest integers are 0, 3, 5, 6, and 7. Therefore the bit sequence is (10010111).

For extremely large jitter, it is possible for one integer to appear multiple times.

This event indicates that one or more neighboring bits are non-distinguishable in arrival time. If local clock has a finer time resolution than data rate, then multiple possibilities can be narrowed down and the correct bit recovery. In the situation where two or more possibilities cannot be eliminated, then the situation indicates that multiple possibilities exist.

Figure 2:
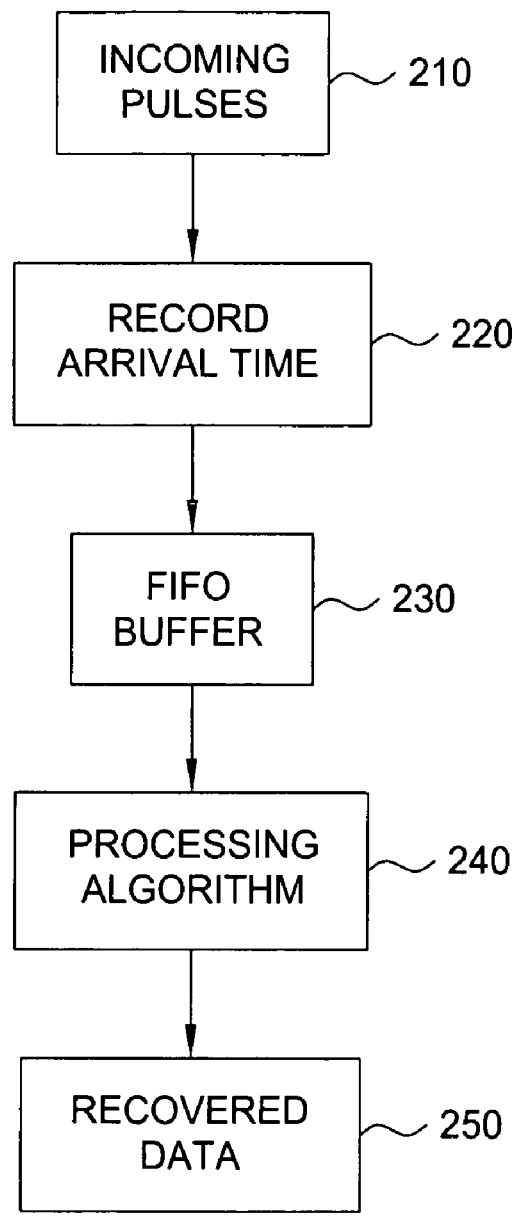
FIG. 2 depicts a flow diagram of a reception method according to an embodiment of the present invention.

FIG. 2 depicts a flow diagram of the receiver according to one embodiment of the present invention. The flow diagram 200 describes a method the receiver determines the input signal without obtaining a clock signal from the input pulse train.

At step 210, the receiver receives the input signal such as a binary pulse train including binary pulses, which can be either electrical pulses or optical pulses.

At step 220, the receiver records an arrival time of each pulse of the incoming pulse train. In one embodiment, for every clock cycle there is a pulse in the pulse train, the value of the local clock is stored as the time stamp for that pulse. Thus, each pulse has associated with it a time stamp.

At step 230, a buffer is used to store the time stamps associated with the incoming pulses. In one embodiment, the buffer is a FIFO buffer. In other embodiments, other kinds of buffers, memories or queues are used. The purpose of the buffer is to not overload the processor if too many pulses are received at one time. The size of the buffer is selected depending on the amount of information to be received and the transmission speed with respect to the processor speed.

At step 240, the buffer transmits the time stamp values to the processor. In one embodiment, the buffer is a FIFO buffer and its output portion for transmission to the processor is triggered by the local clock. The oldest received time stamp is transmitted to the processor when a new time stamp is received by the buffer.

At step 250, the processing algorithm of the processor will process the time stamp values communicated by the buffer in step 240. The algorithm (further described in FIG. 3) determines the time slots of the pulses of the incoming pulse train.

At step 260, the processing algorithm uses the time stamp values of the input pulses of the input pulse train to determine the time slots of the pulses. By knowing the time stamps of the pulses, any time slots with no pulses are also determined. With the knowledge of recovered pulses, the input pulse train is recovered.

Figure 3:
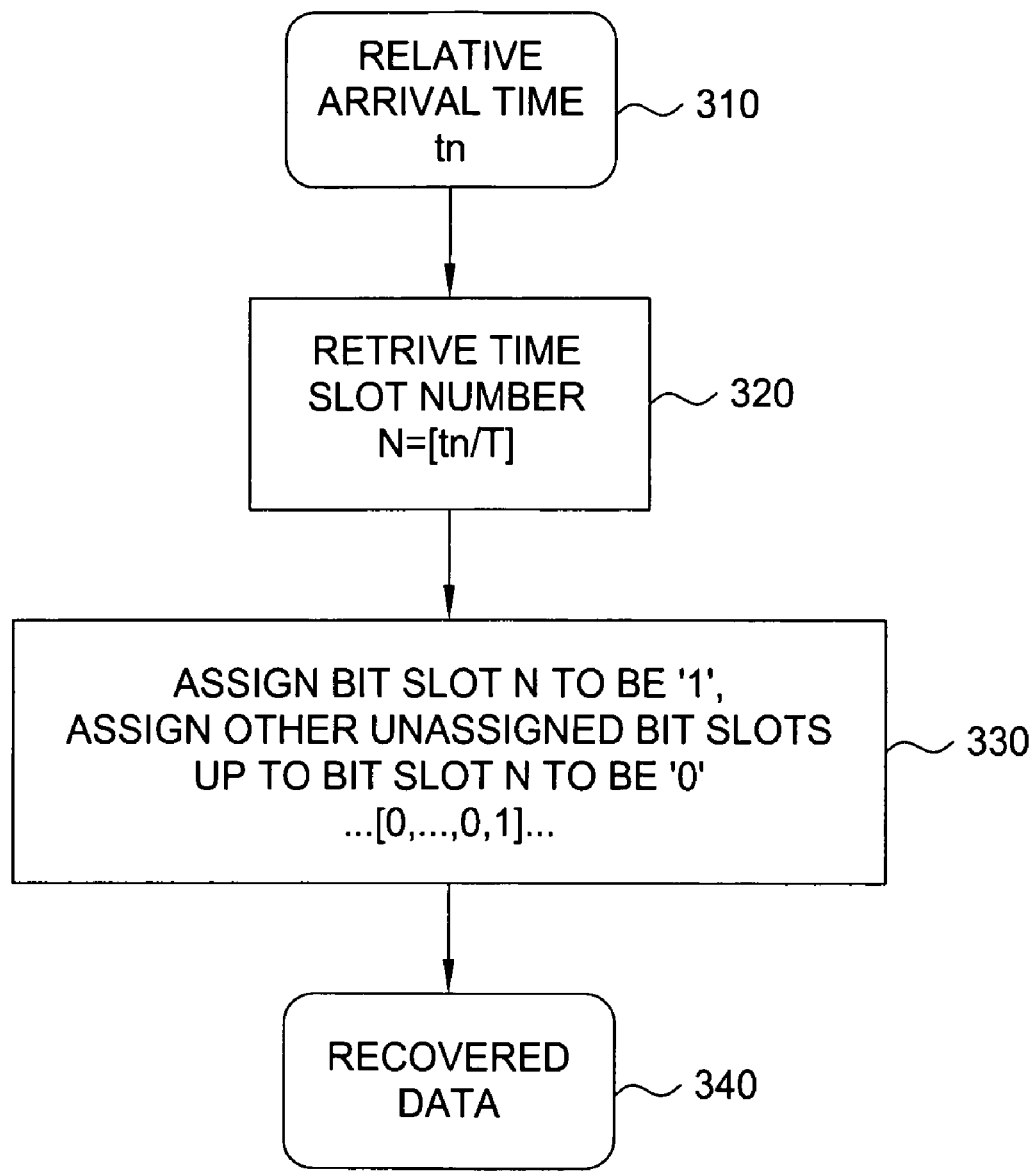
FIG. 3 depicts a flow diagram of a processing method according to an embodiment of the present invention.

FIG. 3 depicts a flow diagram of a processing algorithm according to one embodiment of the present invention. In one embodiment, the processing algorithm 300 is used in the processor 150.

At step 310, a relative arrival time $t_n$ of a pulse is communicated from the buffer 140 to the processor 150. The arrival time is the time stamp of a clock cycle associated with a pulse that is received by the receiver.

At step 320, the relative arrival time is used to determine the slot number of the pulse of the input pulse train. In one embodiment, the slot number N is calculated by multiplying the relative arrival time with the transmission rate: ($N=t_n/T$). The calculation allows the receiver to use the slot numbers to realize the relative positions of the pulses. By analyzing the time stamp value, the processor determines the time slots with 1's.

At step 330, the processor determines all the time slots that do not contain 1's and appends 0's to those slots numbers. As a result of adding 0's to the slots, the processor obtains a stream of 1's and 0's representative of the transmitted signal that is received by the receiver.

At step 340, the processor outputs the recovered data derived from the received time stamps.

Figure 4:
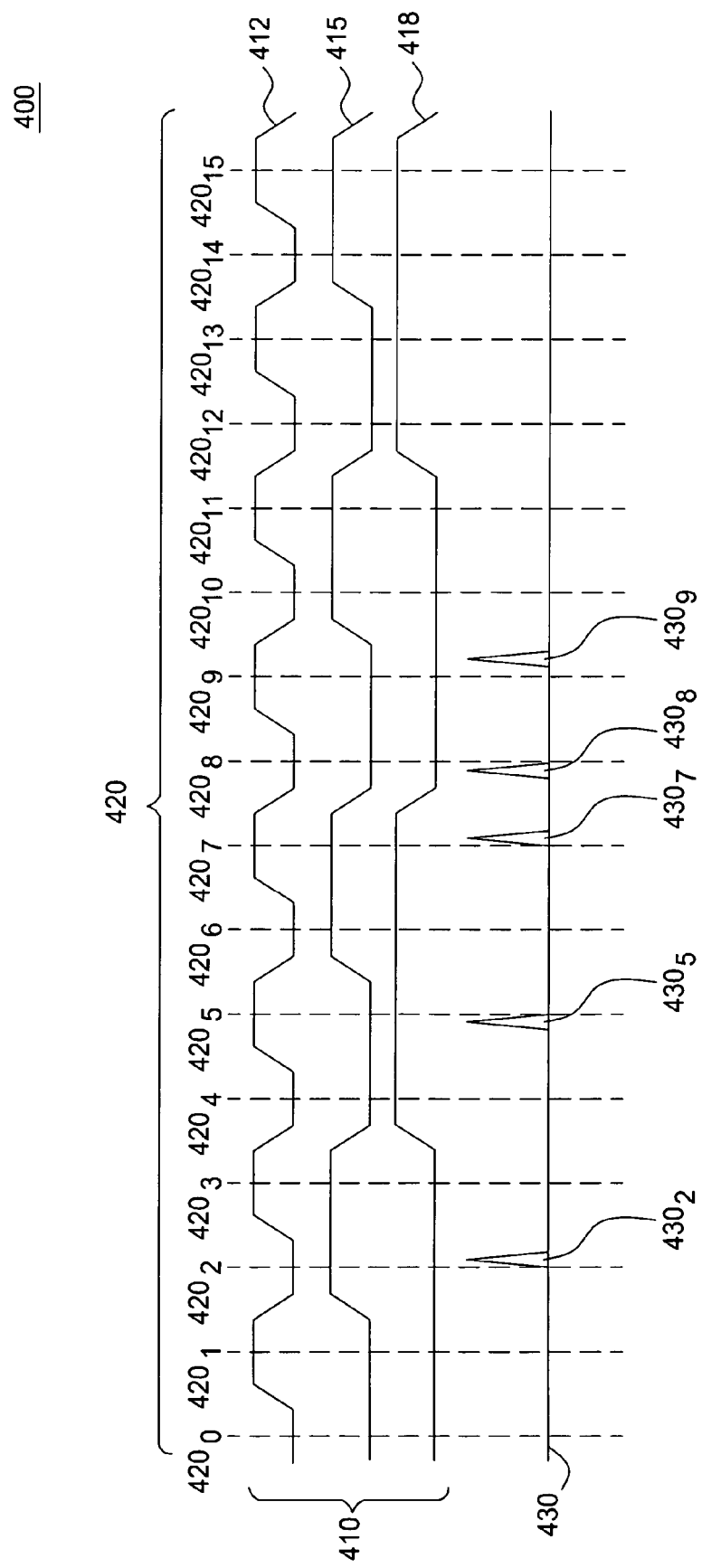
FIG. 4 depicts a timing diagram illustrating the operation of a receiver according to an embodiment of the present invention.

FIG. 4 depicts the timing diagram illustrating the operations of the receiver according to one embodiment of the present invention. The diagram 400 is a representation of the signals received by the receiver and shows how the receiver corrects for jitter in the received pulse train.

The first set of timing traces 410 represents the signals at the output of the n-bit counter. In one embodiment, a 3-bit counter is used and is represented by signals 412, 415 and 418. The combination of the three signals will represent the time slots 0 to 15.

Numbers shown in the top row 420 indicate the numbering of the time slots $420_0$ to $420_{15}$. The top three timing traces are three outputs of the n-bit counter in the example discussed above. The vertical dotted lines are the interval where the pulse should come into the receiver.

Input pulse train 420 is received by receiver 100 and the pulses are shown by $420_2$, $420_5$, $420_7$, $420_8$, $420_9$. The diagram shows incoming data pulses $420_2$, $420_5$, $420_7$, $420_8$, $420_9$ with significant timing jitter. Those pulses are either before or after the time slot. Nonetheless, the buffer 140 will be filled with time stamps of 1s in the input sequence, (010) (101)(111)(000)(001). Therefore the incoming bit sequence (10010111) can be successfully recovered.

In one embodiment, assume the incoming data rate of 40 Gb/s. The incoming bits are scrambled so that the longest consequent zeros or ones would be less than 8 bits. Further assume a 3-bit counter as the timer. The local oscillator runs at nominal 40 GHz, which is the same clock rate that generates the incoming data. The clocks are assumed to be at least Stratum-3/3E compatible, therefore ensuring long term frequency accuracy. In real operation, a clock recovery based on high-Q filters can always be used to track any long term frequency drift between incoming data and local clock. However, benefiting from the frequency accuracy of Stratum-3/3E or higher tier clocks, receiving the burst-mode allows the receiver to start receiving with the first bit without the need to recover any clock signal. Again, take the example of input bit sequence as (10010111) and assume when the first bit 1 triggers S&H, the timer yields a random time stamp (010). As illustrated from FIG. 4, the subsequent time stamps for incoming pulses are (101),(111),(000), and (001). This indicates the bit slots for ones starting from bit slot No. 2 are 2, 5, 7, 8, 9 and the recovered bit sequence is therefore (10010111). It can be seen that due to the operation of logical gates, the receiver can tolerate some large timing jitters.

The present invention of a receiver scheme for synchronous digital transmission is based on fast logical gate operations. The scheme can tolerate uniformly distributed jitter within 50% of the bit period. The scheme can recover burst-mode bit sequences on the first bit. For short data packets, the proposed receiving scheme does not need the recovered clock. Recovered clock is only helpful to track the possible long-term frequency drift between transmitter and receiver clocks. In addition, since the operation of proposed receiver only requires logical gate operations, with all optical implementations of logical gates, the proposed receiver scheme can also be implemented all optically.

While the foregoing is directed to various embodiments of the present invention, other and further embodiments of the invention may be devised without departing from the basic scope thereof. As such, the appropriate scope of the invention is to be determined according to the claims, which follow.

What is claimed is

1. A digital receiver for receiving digital information transmitted in an input pulse train, comprising:
    a counter for providing a sequence of time stamps to a sample and hold circuit;
    the sample and hold circuit for sequentially holding a time stamp from the sequence of time stamps, wherein each pulse from the input pulse train allows the corresponding time stamp to be stored in a buffer; and
    a processor for determining the digital information by analyzing the time stamps stored in the buffer wherein the controller determines the binary value of a time slot by the time stamp and the digital transmission rate.

2. The receiver of claim 1, further comprising a local clock communicably coupled to the counter.

3. The receiver of claim 1, wherein the buffer comprises a first-in-first-out (FIFO) buffer for receiving time stamps from said counter and propagating said time stamps in response to said input pulse train.

4. The receiver of claim 2, wherein the buffer includes shift registers that are triggered by the pulse train.

5. The receiver of claim 1, further comprising optical logic gates adapted to process an optical pulse train.

6. The receiver of claim 1, further comprising electrical logic gates adapted to process an electrical pulse train.

7. The method of claim 6, wherein each time slot includes a time slot number N which is determined by $N=t_n/T$, where $t_n$ is the arrival time of the $n^{th}$ pulse and $1/T$ is the digital transmission rate.

8. A method for recovering data from a sequence of received pulses, comprising:
    recording the arrival times of at least two pulses within said sequence of received pulses, including storing the arrival time of each pulse of the sequence in a buffer;
    determining from the arrival times a temporal relationship of the at least two pulses; and
    assigning a binary value to a time slot determined by the temporal relationship of the pulses.

9. The method of claim 8, wherein the determining and assigning steps further comprises:
    extracting from the buffer a first arrival time associated with the first of the at least two pulses;
    determining a first time slot number using the first arrival time;
    assigning a logical "1" to the time slot associated with the first time slot number;
    extracting from the buffer a second arrival time associated with the second of the at least two pulses;
    determining a second time slot number using the second arrival time;
    assigning a logical "1" to the time slot associated with a second time slot number; and
    assigning a logical "0" to each time slot temporally positioned between the first and second time slots, the time slots having been assigned a logical "1" representing time slots associated with a valid input pulse.

10. The method of claim 8, wherein each time slot includes a time slot number N which is determined by $N=t_n/T$, where $t_n$ is the arrival time of the $n^{th}$ pulse and $1/T$ is the digital transmission rate.

11. The method of claim 8, wherein the received input pulse train includes electrical pulses.

12. The method of claim 8, wherein the received input pulse train includes optical pulses.

13. An apparatus for improving tolerance of input signal timing jitter, comprising:
    means for recording the arrival times of at least two pulses within said input signal;
    means for storing the arrival time of each pulse in a buffer;
    means for determining from the stored arrival times a temporal relationship of the at least two pulses; and
    means for assigning a binary value to a time slot determined by the temporal relationship of the pulses.

14. The apparatus of claim 13, further comprising optical logic gates adapted to process an optical input signal.

15. The apparatus of claim 13, further comprises electrical logic gates adapted to processes an electrical input signal.

16. The apparatus of claim 13, wherein the means for determining and means for assigning further comprising:
    means for extracting from the buffer a first arrival time associated with the first of the at least two pulses;
    means for determining a first time slot number using the first arrival time;
    means for assigning a logical "1" to the time slot associated with the first time slot number;
    means for extracting from the buffer a second arrival time associated with the second of the at least two pulses;
    means for determining a second time slot number using the second arrival time;
    means for assigning a logical "1" to the time slot associated with a second time slot number; and
    means for assigning a logical "0" to each time slot temporally positioned between the first and second time slots, the time slots having been assigned a logical "1"representing time slots associated with a valid input pulse.

17. The apparatus of claim 13, wherein each time slot includes a time slot number N which is determined by $N=t_n/T$, where $t_n$ is the arrival time of the $n^{th}$ pulse and $1/T$ is the digital transmission rate.

18. The apparatus of claim 13, further comprising means for generating a local clock to provide at least two time stamps, each time stamp corresponds to the arrival time of the at least two pulses.

19. The apparatus of claim 18, wherein the temporal relationship is the number of clock cycles separating the at least two pulses.

* * * * *

UNITED STATES PATENT AND TRADEMARK OFFICE
CERTIFICATE OF CORRECTION

PATENT NO.        : 7,577,221 B2
APPLICATION NO.   : 11/365254
DATED             : August 18, 2009
INVENTOR(S)       : Weiguo Yang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 766 days.

Signed and Sealed this

Seventh Day of September, 2010

David J. Kappos
*Director of the United States Patent and Trademark Office*